(12) United States Patent
Nishimura (10) Patent No.: US 10,939,016 B2
(45) Date of Patent: Mar. 2, 2021

(54) IMAGE PROCESSING METHOD AND IMAGE PROCESSING APPARATUS

(71) Applicant: SEIKO EPSON CORPORATION, Tokyo (JP)

(72) Inventor: Shin Nishimura, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/706,903

(22) Filed: Dec. 9, 2019

(65) Prior Publication Data

US 2020/0186674 A1   Jun. 11, 2020

(30) Foreign Application Priority Data

Dec. 11, 2018 (JP) ............................. JP2018-231372

(51) Int. Cl.
*H04N 1/411* (2006.01)
*H04N 1/053* (2006.01)

(52) U.S. Cl.
CPC ............. *H04N 1/411* (2013.01); *H04N 1/053* (2013.01)

(58) Field of Classification Search
CPC ..................................................... H04N 1/411
USPC ....................................................... 358/1.15
See application file for complete search history.

(56) References Cited

U.S. PATENT DOCUMENTS

| 7,072,076 | B2* | 7/2006 | Lapstun | B41J 2/17566 |
| | | | | 358/2.1 |
| 8,411,319 | B2* | 4/2013 | Nguyen | G06K 15/1852 |
| | | | | 358/1.9 |
| 8,743,389 | B2* | 6/2014 | Claiborne | G06F 3/1285 |
| | | | | 358/1.15 |
| 2005/0088699 | A1* | 4/2005 | Silverbrook | G06K 15/1852 |
| | | | | 358/2.1 |
| 2014/0016141 | A1 | 1/2014 | Yamada et al. | |
| 2015/0022863 | A1 | 1/2015 | Fujita et al. | |

FOREIGN PATENT DOCUMENTS

JP   2013-230674 A   11/2013
JP   2015-023469 A    2/2015

* cited by examiner

*Primary Examiner* — Jacky X Zheng
(74) *Attorney, Agent, or Firm* — Global IP Counselors, LLP (57) ABSTRACT

An image processing method includes an image encoding step of encoding data in which one channel in each pixel of image data including a plurality of pixels is configured by 2 bits or more into data in which the one channel is configured by 1 bit, a transfer step of transferring the encoded data to a printing apparatus, and an image decoding step of decoding the encoded data using the printing apparatus, in which, in the image encoding step, flag information indicating whether the pixel is a character or a line image or a photograph is assigned, and in the image decoding step, decoding is performed by selecting a first decoding method or a second decoding method based on the flag information.

10 Claims, 10 Drawing Sheets

IMAGE PROCESSING METHOD AND IMAGE PROCESSING APPARATUS

The present application is based on, and claims priority from JP Application Serial Number 2018-231372, filed Dec. 11, 2018, the disclosure of which is hereby incorporated by reference herein in its entirety.

BACKGROUND

1. Technical Field

The present disclosure relates to an image processing method and an image processing apparatus.

2. Related Art

In general, when conversion from multi-gradation image data to dot data having a low gradation value is performed by a printer, it is necessary to transfer the image data to the printer. Since the multi-gradation image data has a large size, there is a known method of reducing the amount of data to be transferred by reducing a data size at a terminal that transfers the image data when the image data is transferred to the printer.

For example, in JP-A-2013-230674, in order to reduce a data size, a terminal that transfers image data separates the image data into a black character portion and a color image portion, thereby, generating a black character image and a color image. A color image is converted into an image with a low resolution and further compressed by using a general compression method. A black character image is reversibly compressed. The compressed black character image and color image are transferred to a printer.

However, in JP-A-2013-230674, there is a concern that a high compression is realized for the black character image of the black character portion but the high compression cannot be realized for the color image of the color image portion.

Further, since the amount of data is large because the image data is 8 bits or the like, a compression rate is reduced, the amount of data which is transferred is large, and decoding processing on the printer side is also increased, and thereby, there is a concern that processing speed of overall image processing before printing is delayed.

SUMMARY

An image processing method according to a first aspect of the present disclosure includes an image encoding step of encoding data in which one channel in each pixel of image data including a plurality of pixels is configured by 2 bits or more into data in which the one channel is configured by 1 bit, a transfer step of transferring the encoded data to a printing apparatus, and an image decoding step of decoding the encoded data in the printing apparatus, in which, in the image encoding step, flag information indicating whether the pixel is a character or a line image or a photograph is assigned, and in the image decoding step, decoding is performed by selecting a first decoding method or a second decoding method based on the flag information.

In the image processing method, an error may be diffused in a main scanning direction by using an error diffusion method to form the 1-bit data in the image encoding step.

In the image processing method, the 1-bit data may be decoded into 8-bit data in the image decoding step.

The image processing method may further include an image compression step of further compressing the encoded data.

In the image processing method, a run-length compression may be used in the image compression step.

In the image processing method, a ratio of the pixels that are ON in a predetermined range of the plurality of pixels may be calculated and a value obtained by multiplying the ratio by a maximum gradation value per pixel may be set to the value in the predetermined range of the plurality of pixels in the image decoding step.

An image processing apparatus according to a second aspect of the present disclosure includes an image encoding section that encodes data in which one channel in each pixel of image data including a plurality of pixels is configured by 2 bits or more into data in which the one channel is configured by 1 bit, a transfer section that transfers the encoded data to a printing apparatus, and an image decoding section that decodes the encoded data in the printing apparatus, in which the image encoding section assigns flag information indicating whether the pixel is a character or a line image or a photograph, and the image decoding section performs decoding by selecting a first decoding method or a second decoding method based on the flag information.

In the image processing apparatus, the image encoding section may diffuse an error in a main scanning direction by using an error diffusion method to form the 1-bit data.

In the image processing apparatus, the image decoding section may decode the 1-bit data into 8-bit data.

The image processing apparatus may further include an image compression section that further compresses the encoded data.

In the image processing apparatus, the image compression section may use a run-length compression.

In the image processing apparatus, the image decoding section may calculate a ratio of the pixels that are ON in a predetermined range of the plurality of pixels and may set a value obtained by multiplying the ratio by a maximum gradation value per pixel to the value in the predetermined range of the plurality of pixels.

DESCRIPTION OF EXEMPLARY EMBODIMENTS

Hereinafter, embodiments embodying the present disclosure will be described with reference to the drawings. The drawings to be used are illustrated in an appropriately enlarged or reduced state such that parts to be described can be recognized.

Figure 1:
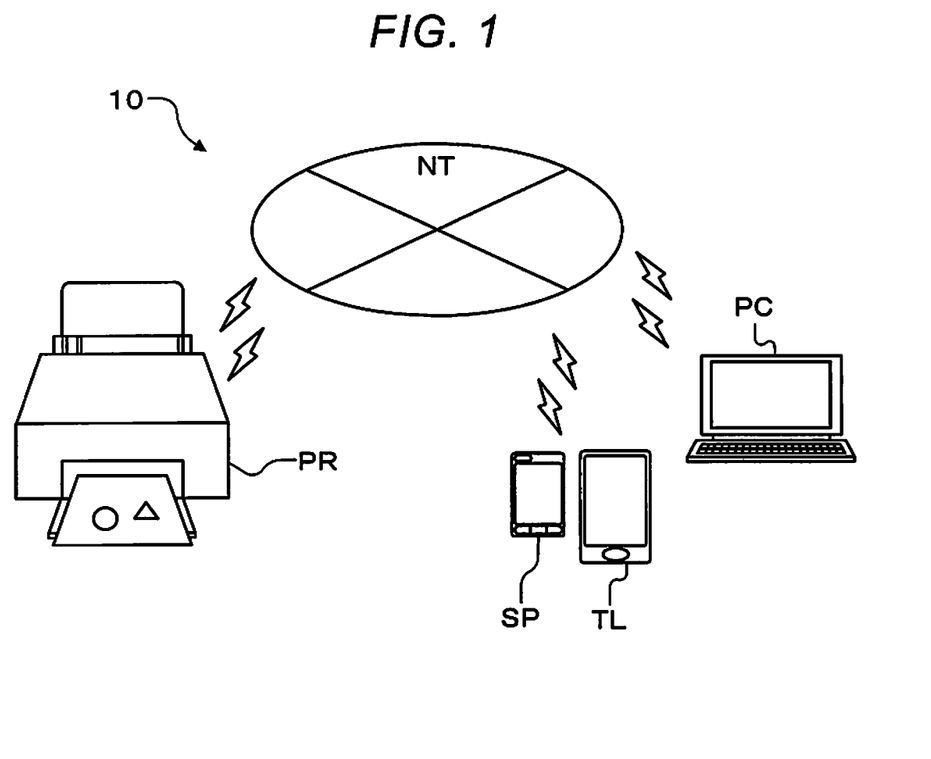
FIG. 1 is a diagram illustrating a schematic configuration of a printing system according to the present embodiment.

FIG. 1 is a diagram illustrating a schematic configuration of a printing system as an image processing apparatus according to the present embodiment.

As illustrated in FIG. 1, the printing system 10 according to the present embodiment includes a computer PC that generates and selects an image, a tablet TL, a smartphone SP, a printer PR as a printing apparatus that is connected to the computer PC, the tablet TL, and the smartphone SP and performs actual printing, and a network NT for connecting the computer, the tablet, the smartphone, and the printer.

The computer PC, the tablet TL, and the smartphone SP each hold image data configured by a plurality of pixels. The computer PC, the tablet TL, and the smartphone SP encode data in which one channel of each pixel of image data is configured by 2 bits or more such that one channel is configured by 1 bit, and the encoded data is transferred to the printer PR via the network NT.

The printer PR receives the encoded data and decodes the received encoded data. The image data printed by the printer PR is an RGB image in which one channel is configured by 8 bits in the present embodiment. However, the channel is not necessary to be limited to 8 bits and may be 2 bits or more.

Figure 2:
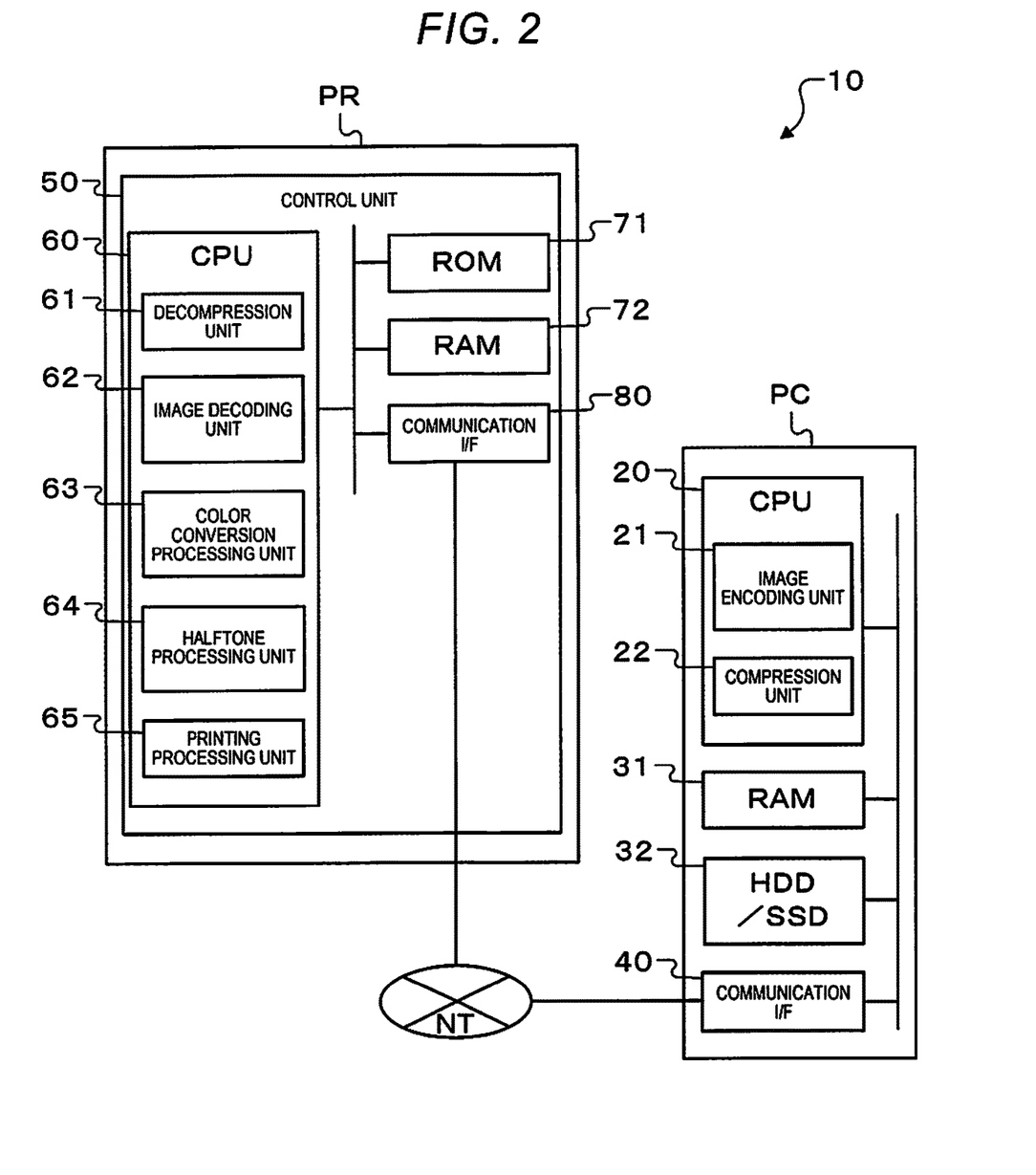
FIG. 2 is a diagram schematically illustrating the printing system according to the present embodiment.

FIG. 2 is a diagram schematically illustrating the printing system 10 according to the present embodiment. Since the computer PC, the tablet TL, and the smartphone SP have the same function, the following description will be made by using the computer PC.

As illustrated in FIG. 2, the computer PC is configured with a CPU 20, a RAM 31, an HDD/SSD 32, and a communication I/F 40 as a transfer section, which are coupled to each other via a bus.

The CPU 20 performs processing according to a program held in the HDD/SSD 32 or the RAM 31.

The RAM 31 is a volatile storage and temporarily stores the program and data.

The HDD/SSD 32 is a non-volatile storage and holds the program and data in the same manner. In the present embodiment, the HDD/SSD 32 holds image data configured by a plurality of pixels.

The communication I/F 40 can transfer data, and transfers the encoded data to the printer PR. The communication I/F 40 controls data transfer and reception to and from the printer PR. USB, IEEE 1394, LAN, or the like can be used as a connection method of the communication I/F 40.

The computer PC develops a program of the HDD/SSD 32 in the RAM 31 and performs the program, thereby, functioning as an image encoding unit 21 as an image encoding section and a compression unit 22 as an image compression section.

The image encoding unit 21 encodes data in which one channel in each pixel of image data configured by a plurality of pixels is configured by 2 bits or more such that one channel is configured by 1 bit. The image encoding unit 21 assigns flag information indicating whether a pixel is a character or a line image or a photograph. The image encoding unit 21 assigns, to each pixel of image data configured by a plurality of pixels, the flag information indicating whether the pixel is a character or a line image or a photograph. The flag information is data of "0" or "1" indicating whether the pixel is a character or a line image or a photograph, and is assigned to each pixel of image data.

The printer PR includes a printing unit or the like which is not illustrated and performs an actual printing operation under a control of a control unit 50 that performs various types of printing control.

The control unit 50 is configured with a CPU 60, a ROM 71, a RAM 72, and a communication I/F 80 as a transfer section, which are coupled to each other via a bus.

The CPU 60 performs processing of each embodiment which will be described below according to a program stored in the ROM 71 or the RAM 72.

The RAM 72 is a volatile storage and temporarily holds the program and data.

The ROM 71 is a nonvolatile storage and holds a program used in processing which will be described below.

The communication I/F 80 controls data transfer and reception to and from the computer PC. The communication I/F 80 can receive encoded data. The communication I/F 80 receives the encoded data from the computer PC.

The control unit 50 develops a program stored in the ROM 71 in the RAM 72 and performs the program, thereby controlling an overall operation of the printer PR, and also functions as a decompression unit 61, an image decoding unit 62 as an image decoding section, a color conversion processing unit 63, a halftone processing unit 64, and a printing processing unit 65.

The image decoding unit 62 decodes the encoded data in the printer PR. The image decoding unit 62 performs decoding by selecting a first decoding method which will be described below or a second decoding method which will be described below, based on the flag information. The image decoding unit 62 can select two image decoding methods of the first decoding method and the second decoding method, based on the flag information indicating whether or not a character or a line image or a photograph is assigned to each pixel.

Figure 3:
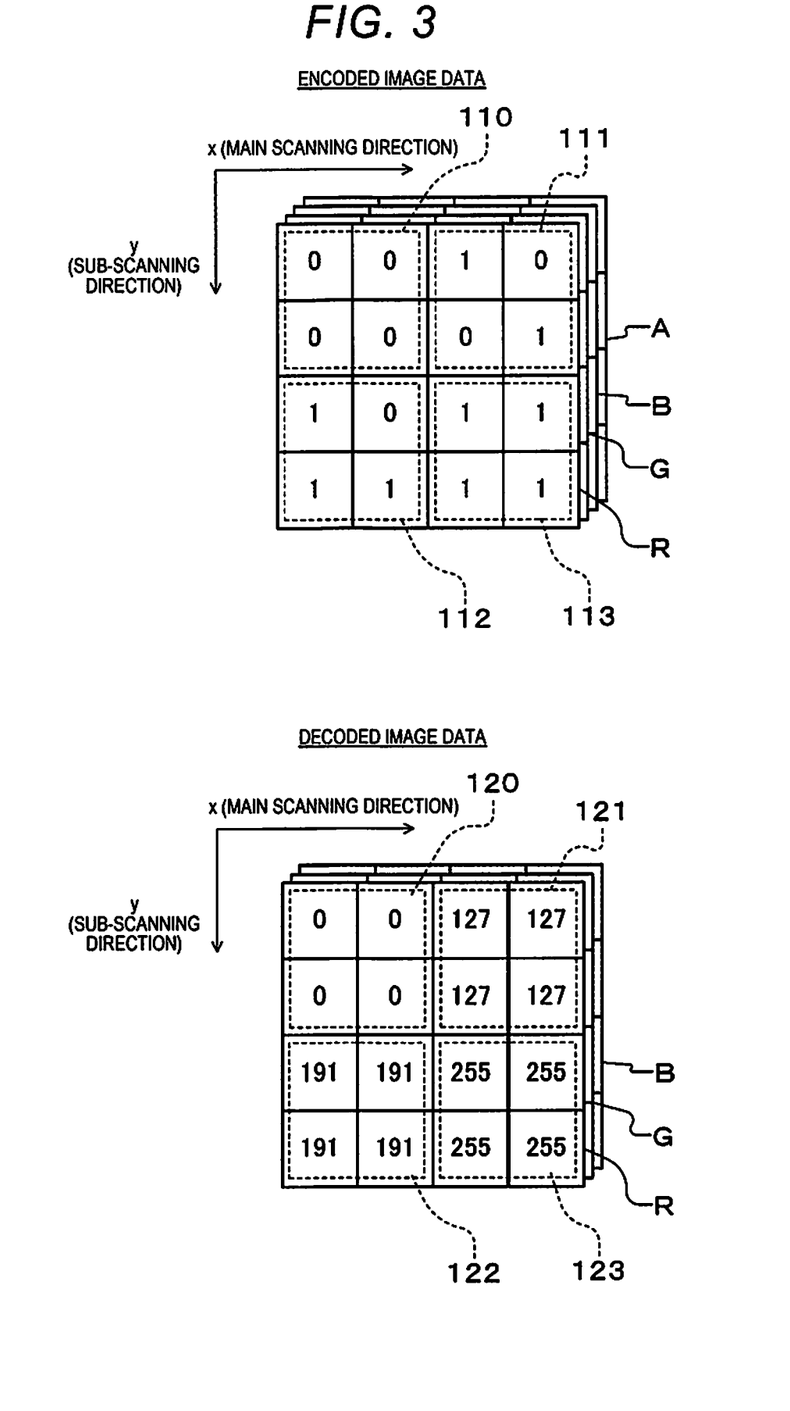
FIG. 3 is a diagram schematically illustrating encoded image data and decoded image data according to the present embodiment.

FIG. 3 is a diagram schematically illustrating encoded image data and decoded image data according to the present embodiment. For example, as denoted as "encoded image data" in FIG. 3, the image decoding unit 62 performs processing in units of blocks 110 to 113 for each channel of four pixels of two pixels in a main scanning direction x and two pixels in a sub-scanning direction y. The image decoding unit 62 calculates a ratio of "1" in the block. As denoted as "decoded image data" in FIG. 3, the image decoding unit 62 sets values obtained by multiplying the value by maximum gradation values of the decoded data as values of the pixels in the blocks 120 to 123. For example, when the block 111 of the channel R is decoded, the ratio of "1" in the block is 2/4. When this is decoded into 8-bit data, a value "127" obtained by multiplying "255", which is the maximum gradation value of 8 bits, by 2/4, becomes a decoded pixel value in the block 121. The decoding is performed for each of RGB channels and is not performed for a channel A holding information of a character and a line image.

In the above-described example, the image decoding unit 62 sets a block range to four pixels of two pixels in the main scanning direction x and two pixels in the sub-scanning direction y, but the range is freely determined.

Figure 4:
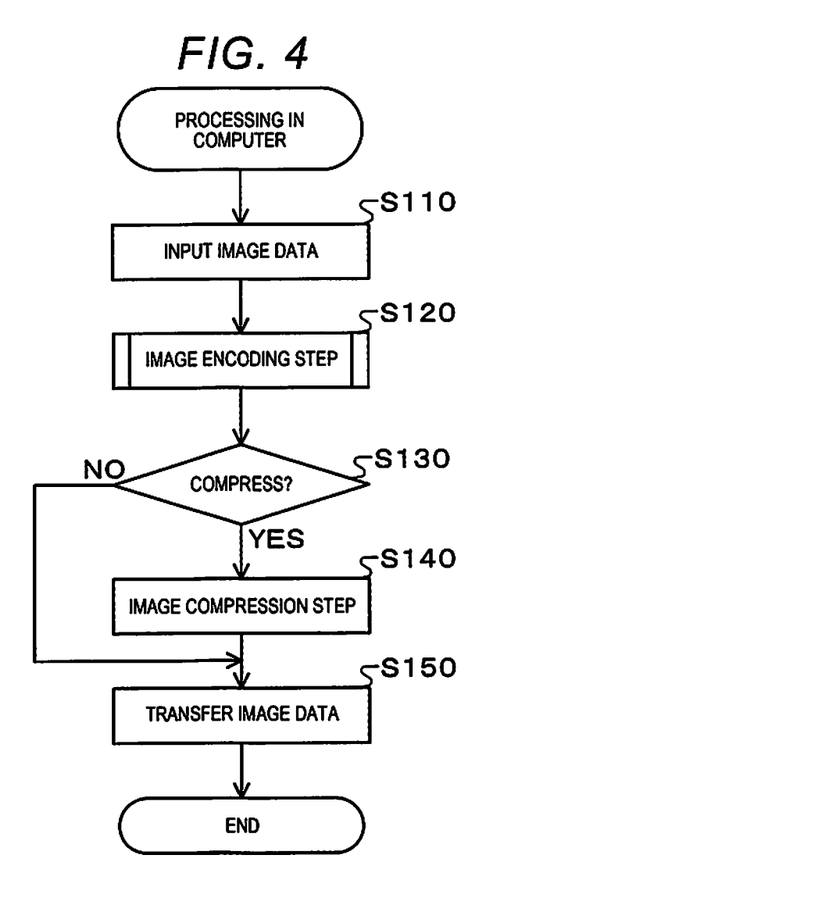
FIG. 4 is a flowchart illustrating an image processing method according to the present embodiment.

FIG. 4 is a flowchart illustrating an image processing method according to the present embodiment.

The image processing method includes an image encoding step and a transfer step.

In the image encoding step, data in which one channel in each pixel of image data configured by a plurality of pixels is configured by 2 bits or more is encoded such that one channel is configured by 1 bit. In the image encoding step, flag information indicating whether a pixel is a character or a line image or a photograph is assigned.

In the image encoding step, it is preferable that an error is diffused in the main scanning direction x to configure 1-bit data by using an error diffusion method. According to this, since an encoding algorithm is simple, an efficient compression can be made. The image encoding step is performed by the image encoding unit 21.

In the transfer step, the encoded data is transferred to the printer PR. The transfer step is performed by the communication I/Fs 40 and 80.

The image processing method includes an image compression step. The image compression step further compresses the encoded data. According to this, it is possible to reduce the amount of data transferred to the printer PR by further compressing the encoded data. Further, by performing decompression of the data encoded by the printer PR, it is possible to perform printing without need to transfer data used for color conversion processing and halftone processing other than the printer PR.

The image compression step preferably uses a run-length compression. According to this, a compression rate can be further improved by combining with an existing compression technique. The image compression step is performed by the compression unit 22.

The flowchart illustrated in FIG. 4 will be described. The computer PC performs steps S110 to S150.

First, in step S110, the computer PC inputs image data to be printed which is input by a user into the RAM 31. In the present embodiment, the image data to be printed is an RGB image in which one channel is configured by 8 bits. However, it is not necessary to be limited to 8 bits and may be 2 bits or more.

Next, in step S120, the image encoding unit 21 performs the above-described encoding of the image data.

Hereinafter, the image encoding step will be described with reference to the flowchart of FIG. 5.

Figure 5:
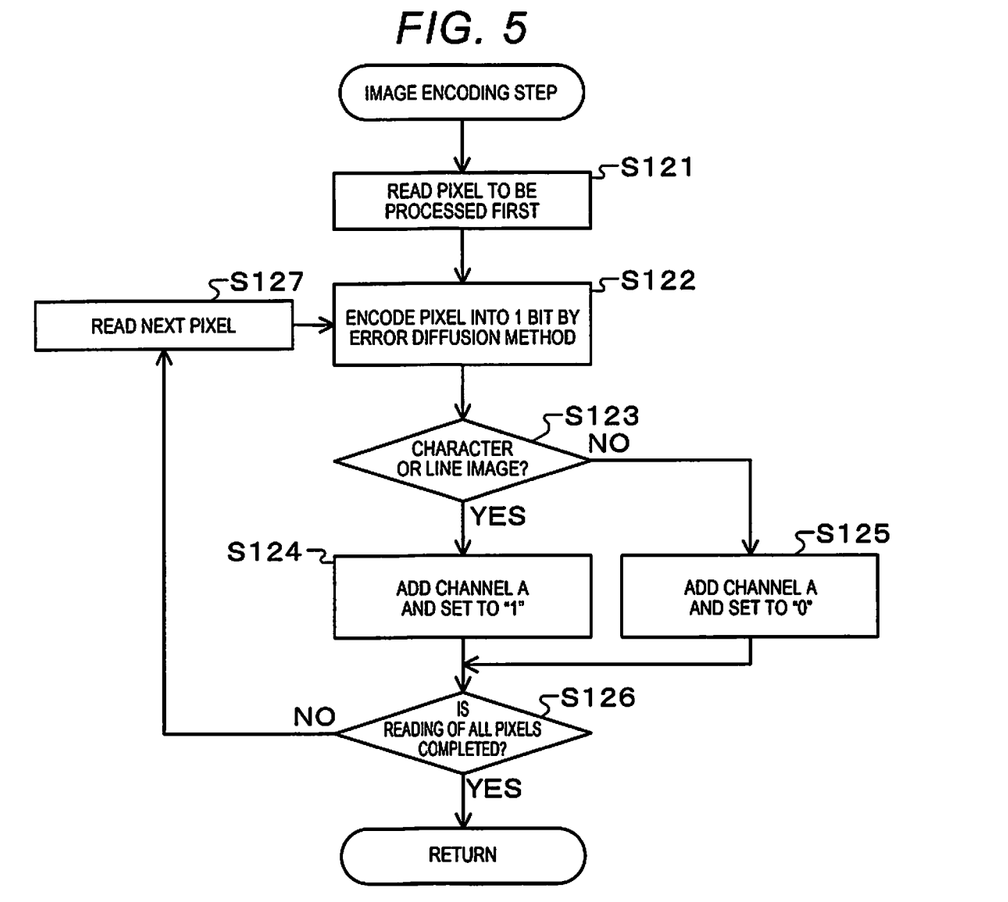
FIG. 5 is a flowchart illustrating an image encoding step according to the present embodiment.

FIG. 5 is a flowchart illustrating an image encoding step according to the present embodiment. The image encoding step is as follows.

First, in step S121, the image encoding unit 21 reads a pixel to be processed first.

Next, in step S122, the image encoding unit 21 encodes 8 bits into 1 bit by using an error diffusion method for the read pixel.

The image encoding unit 21 preferably diffuses an error in the main scanning direction x using the error diffusion method to form 1-bit data. According to this, since an encoding algorithm is simple, an efficient compression can be made.

Figure 6:
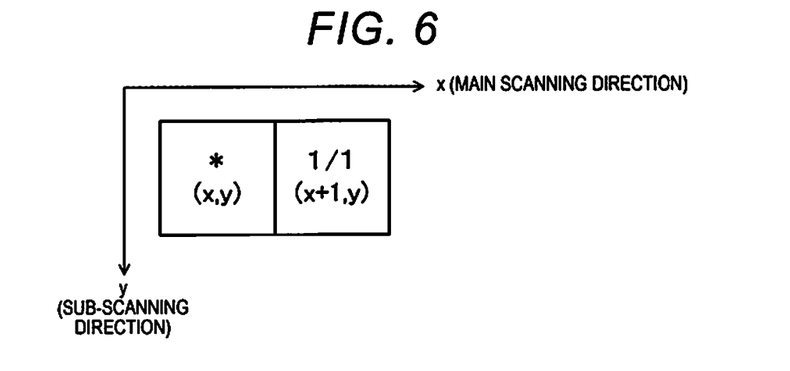
FIG. 6 is a diagram schematically illustrating an error propagation by an error diffusion method according to the present embodiment.

FIG. 6 is a diagram schematically illustrating an error propagation by using the error diffusion method according to the present embodiment. In the present embodiment, the error diffusion method is used for an encoding method, and the error propagation is made only to adjacent pixels in the main scanning direction x as illustrated in FIG. 6. A method other than the error diffusion method, such as a minimum average error method, may be employed as an encoding method.

The image encoding unit 21 encodes data in which one channel in each pixel of image data configured by a plurality of pixels is configured by 2 bits or more such that one channel is configured by 1 bit.

The processing returns to FIG. 5.

Next, in step S123, the image encoding unit 21 branches the processing depending on the read pixel. When the read pixel is a character or a line image (YES), the processing proceeds to step S124. When read pixel is a photograph or the like other than the character or the line image (NO), the processing proceeds to step S125. Any method may be used as a character and the line image determination unit. For example, a simple determination method may be used in which a pixel having RGB values of R=0, G=0, and B=0 is a character or a line image.

Next, in step S124, the image encoding unit 21 adds 1-bit channel A as flag information and sets to "1" in order to have information of a character and a line image.

Next, in step S125, the image encoding unit 21 adds 1-bit channel A as flag information and sets to "0" in order to have information that is not a character or a line image.

Figure 7:
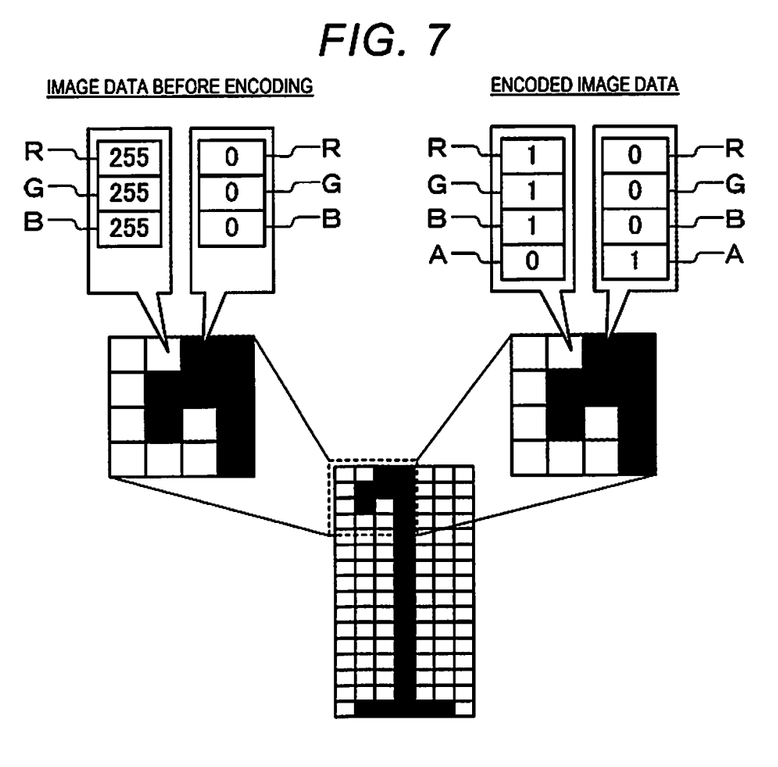
FIG. 7 is a diagram schematically illustrating image data according to the present embodiment.

FIG. 7 is a diagram schematically illustrating image data according to the present embodiment. For example, as illustrated in FIG. 7, when there is only a pixel corresponds to a character, a value of channel A is set to "1" and values of portions other than that are set to "0", as denoted as "encoded image data" in FIG. 7.

The processing returns to FIG. 5.

Next, in step S126, the image encoding unit 21 repeats the processing until reading of all pixels is completed. When reading of all pixels is not read (NO), the image encoding unit 21 proceeds to step S127. When reading of all pixels is completed (YES), the image encoding unit 21 ends the image encoding step.

Next, in step S127, the image encoding unit 21 reads the next pixel.

The above is the image encoding step. Thereby, by encoding data in which 1 channel is configured by 8 bits into data in which 1 channel is configured by 1 bit, original data of 24 bits can be reduced to data of 4 bits.

The processing returns to FIG. 4.

Next, in step S130, the computer PC determines whether to compress the encoded data. When compressing (YES), the processing proceeds to step S140. When not compressing (NO), the processing proceeds to step S150.

Next, in step S140, the compression unit 22 performs an image compression step. The compression unit 22 compresses the encoded data. The compression unit 22 preferably has an image compression step of further compressing the encoded data. According to this, it is possible to reduce the amount of data transferred to the printer PR by further compressing the encoded data. Further, by performing decompression of the data encoded by the printer PR, it is possible to perform printing without need to transfer data used for color conversion processing and halftone processing other than the printer PR.

The compression unit 22 preferably uses the run-length compression. According to this, it is possible to further improve a compression rate by combining with an existing compression technique. Although the run-length compression method is used in the present embodiment, any existing method may be used as long as the compression is a lossless compression. Thereby, it is possible to further reduce the amount of data transfer.

Next, in step S150, the communication I/F 40 performs a transfer step. The communication I/F 40 transfers the compressed and encoded data to the printer PR.

The above is processing performed by the computer PC.

Figure 8:
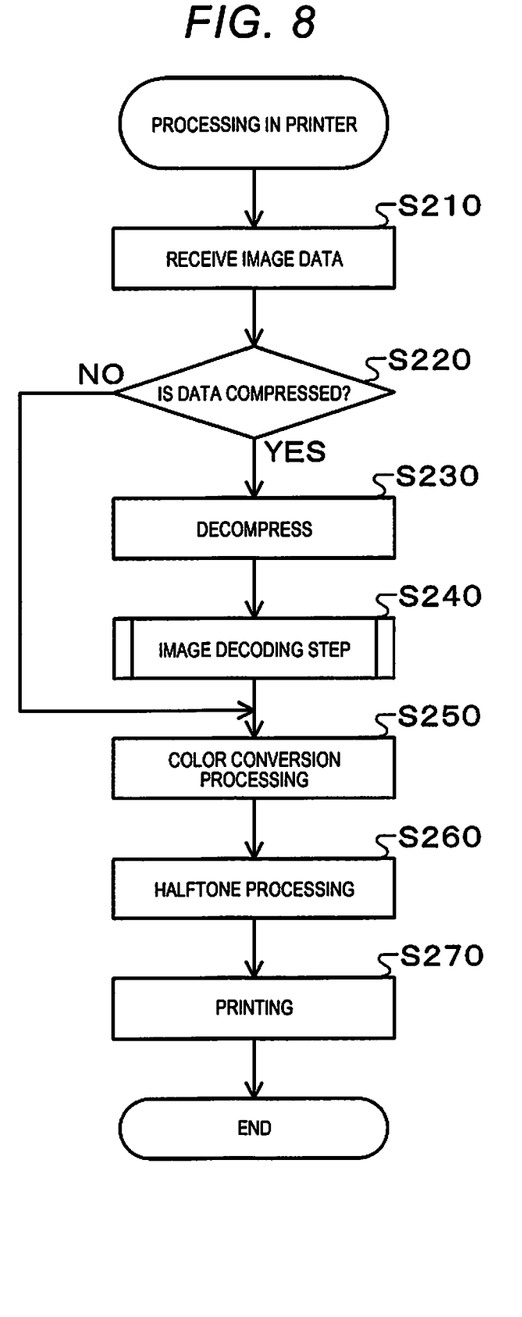
FIG. 8 is a flowchart illustrating an image processing method according to the present embodiment.

FIG. 8 is a flowchart illustrating an image processing method according to the present embodiment.

The image processing method includes an image decoding step. In the image decoding step, the encoded data is decoded in the printer PR. In the image decoding step, decoding is performed by selecting a first decoding method or a second decoding method based on the flag information.

In the image decoding step, it is preferable to decode 1-bit data into 8-bit data. According to this, efficient decoding can be performed.

In the image decoding step, a ratio of ON pixels is calculated in a predetermined range of a plurality of pixels, and a value obtained by multiplying the ratio by a maximum gradation value per pixel preferably becomes the predetermined range of the plurality of pixels. According to this, efficient decoding can be performed. The image decoding step is performed by the image decoding unit 62.

The flowchart illustrated in FIG. 8 will be described. The printer PR performs steps S210 to S270.

First, in step S210, the communication I/F 80 performs a transfer step. The communication I/F 80 receives encoded data from the computer PC.

Next, in step S220, the CPU 20 branches the processing into when the data encoded by the computer PC is compressed and when the data is not compressed. When the data is compressed (YES), the processing proceeds to step S230. When the data is not compressed (NO), the processing proceeds to step S250.

Next, in step S230, the decompression unit 61 decompresses the received encoded data. In the present embodiment, the run-length compression data is decompressed.

Next, in step S240, the image decoding unit 62 performs an image decoding step. The image decoding unit 62 performs decoding for the decompressed data.

Hereinafter, the image decoding step will be described with reference to the flowchart of FIG. 9.

Figure 9:
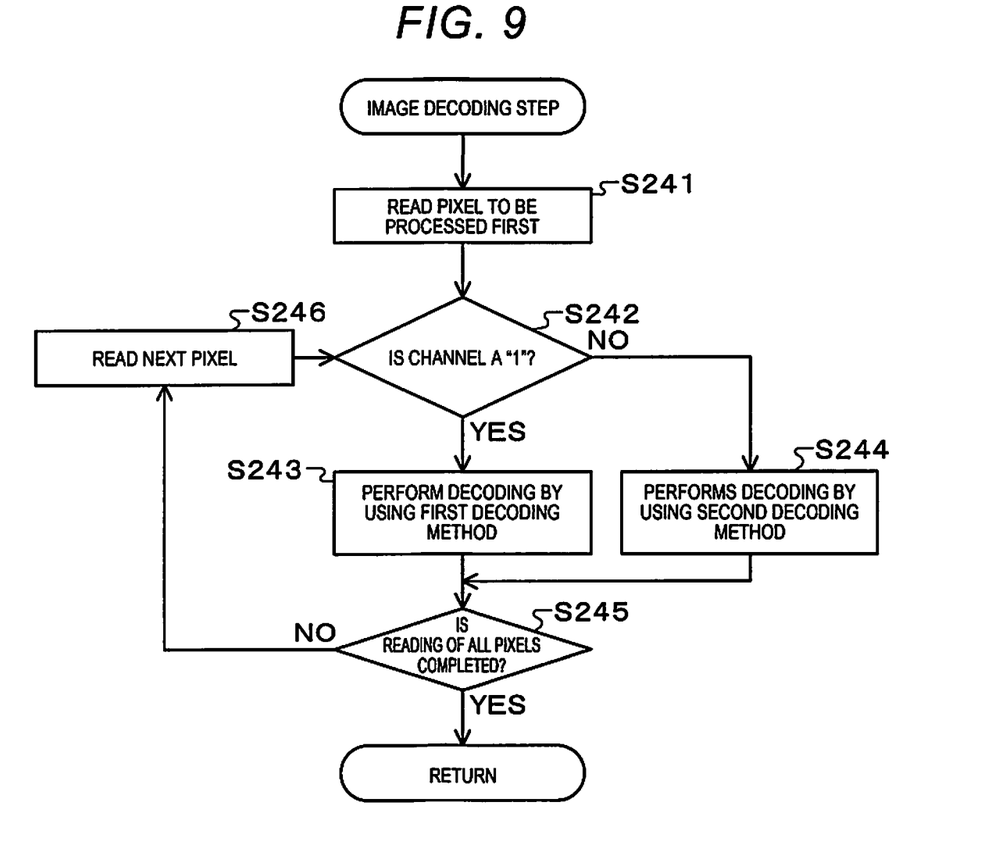
FIG. 9 is a flowchart illustrating an image decoding step according to the present embodiment.

FIG. 9 is a flowchart illustrating the image decoding step according to the present embodiment. The image decoding step is as follows.

First, in step S241, the image decoding unit 62 reads a pixel to be processed first.

Next, in step S242, the image decoding unit 62 determines whether the channel A of the read pixel is "1" or "0". When the channel A is "1" (YES), the image decoding unit 62 proceeds to step S243. When the channel A is "0" (NO), the image decoding unit 62 proceeds to step S244.

Next, in step S243, the image decoding unit 62 performs decoding by using the first decoding method.

Figure 10:
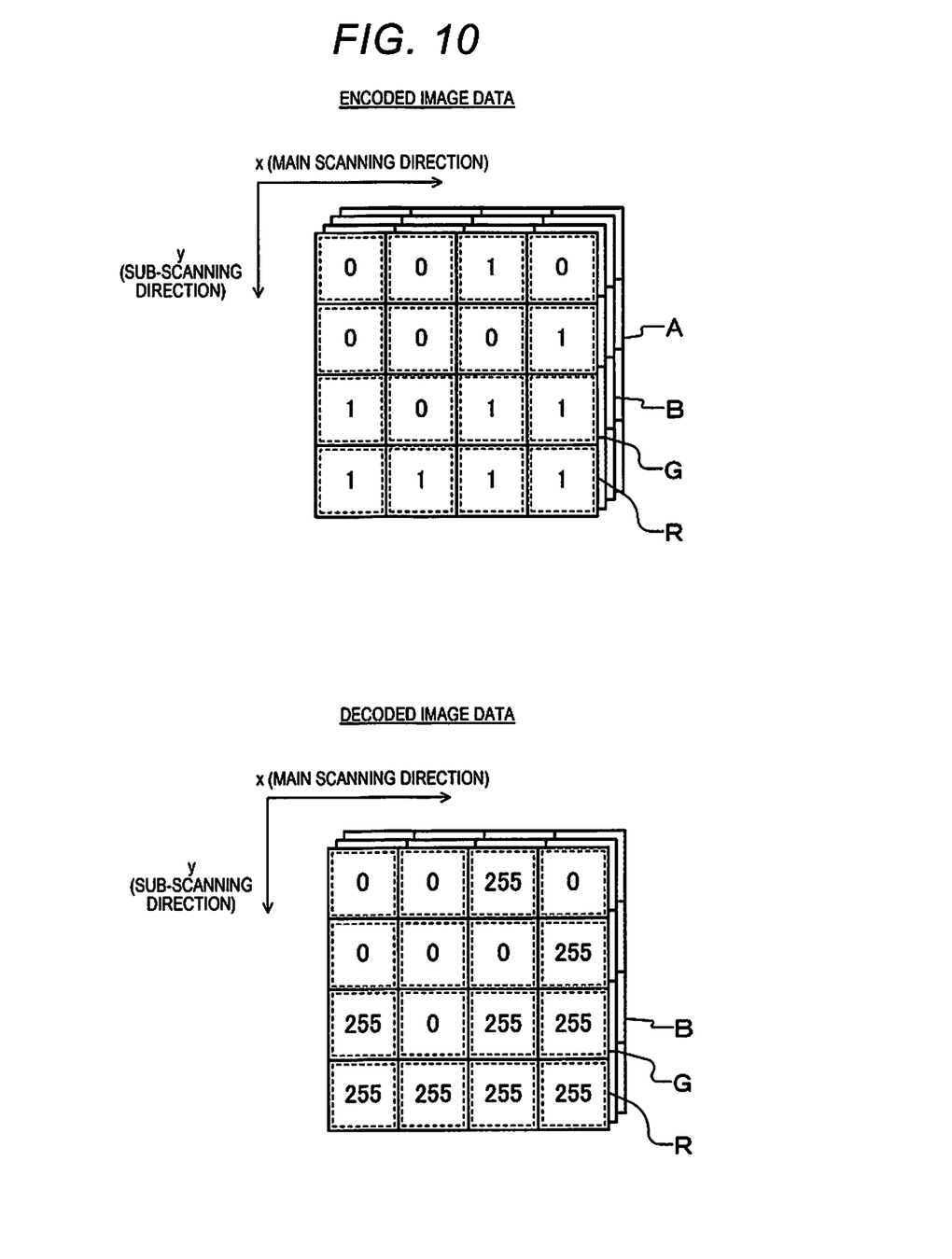
FIG. 10 is a diagram schematically illustrating encoded image data and image data decoded by using a first decoding method, according to the present embodiment.

FIG. 10 is a diagram schematically illustrating the encoded image data according to the present embodiment and the image data decoded by using the first decoding method. As denoted as "encoded image data" in FIG. 10, the image decoding unit 62 sets a block range as one pixel in the main scanning direction x and one pixel in the sub-scanning direction y. In this case, as denoted as "decoded image data" in FIG. 10, the since a value that can be taken by the decoded pixel is "0" or "255", an edge is not impaired and a high quality can be maintained for a character and a line image. The block ranges may not be the same in the image data.

The processing returns to FIG. 9.

Next, in step S244, the image decoding unit 62 performs decoding by using the second decoding method.

Figure 11:
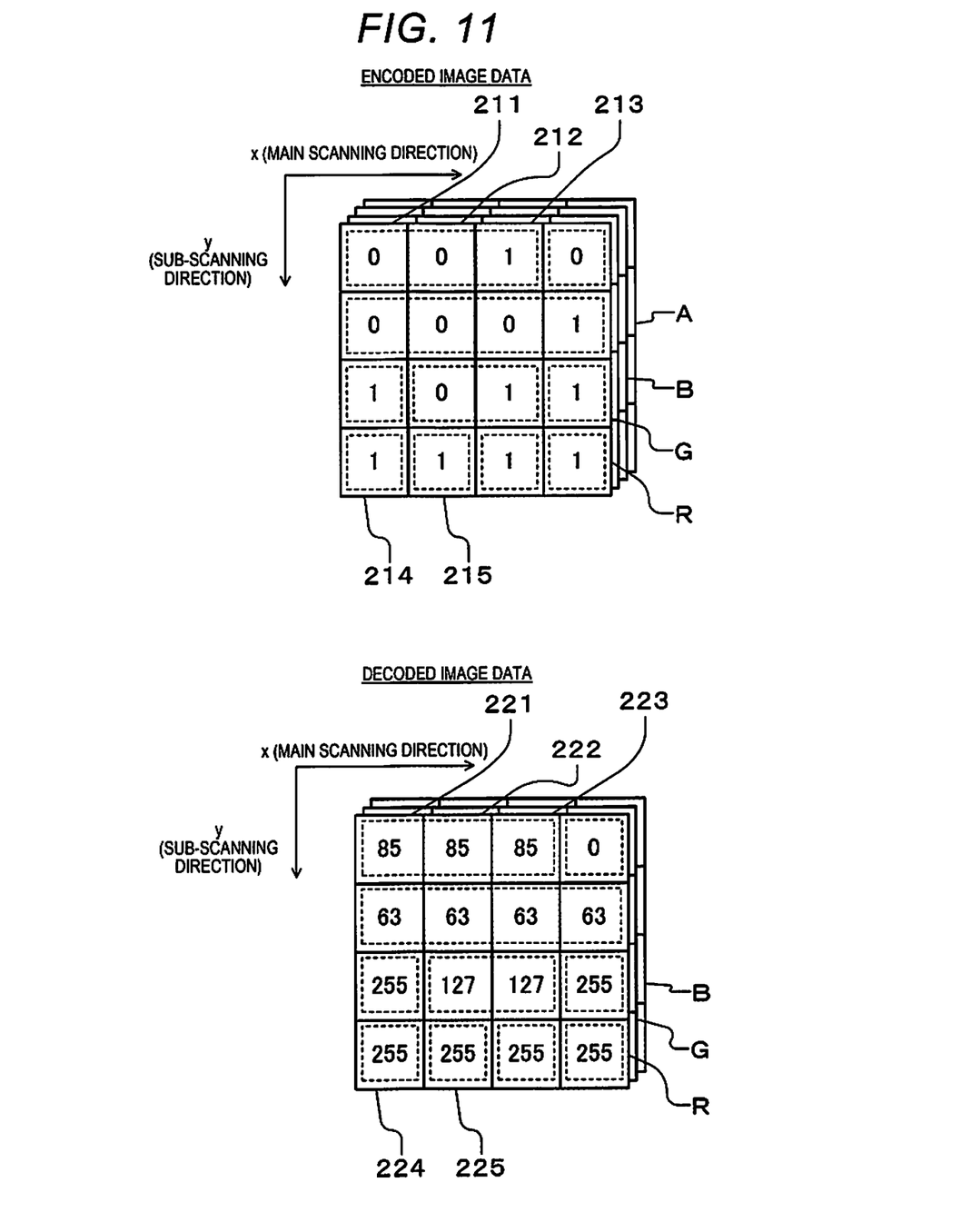
FIG. 11 is a diagram schematically illustrating the encoded image data and image data decoded by a second decoding method, according to the present embodiment.

FIG. 11 is a diagram schematically illustrating the encoded image data according to the present embodiment and the image data decoded by using the second decoding method. As denoted as "encoded image data" in FIG. 11, the image decoding unit 62 takes a range so as to block pixels until "1" appears in the main scanning direction x. In the pixels 211 to 213, "1" appears for the first time in the pixel 213 in the main scanning direction x, and thus the pixels 211 to 213 form one block. The decoded pixels illustrated in "decoded image data" in FIG. 11 have a value "85" obtained by multiplying "255" by ⅓ as in pixels 221 to 223. The pixels in which "1" is continuous in the main scanning direction x are separate blocks as in the pixels 214 and 215 and are decoded to become the values of pixels 224 and 225. Thereby, since the decoded pixel can take more values, gradation is improved as compared with the above-described method of determining the block range, and quality of the photograph can be maintained.

The above-described first decoding method is effective for a character and a line image, and the second decoding method is effective for a photograph. The image decoding unit 62 selects the first decoding method or the second decoding method, based on the flag information and performs the decoding. Thereby, by changing a way of taking the range based on information of the channel A, it is possible to maintain qualities of a character, a line image, and a photograph in the step of decoding the encoded image data.

The image decoding unit 62 preferably decodes 1-bit data into 8-bit data. According to this, efficient decoding can be performed.

It is preferable that the image decoding unit 62 calculates a ratio of pixels that are ON, in other words, "1" in a predetermined range of a plurality of pixels and sets a value obtained by multiplying the ratio by a maximum gradation value per pixel to a value in the predetermined range of the plurality of pixels. According to this, efficient decoding can be performed.

The processing returns to FIG. 9.

Next, in step S245, the image decoding unit 62 determines whether or not all pixels are read. The image decoding unit 62 repeats the processing until reading of all pixels is completed. When reading of all pixels is not read (NO), the image decoding unit 62 proceeds to step S246. When reading of all pixels is completed (YES), the image decoding unit 62 ends the image decoding step.

Next, in step S246, the image decoding unit 62 reads the next pixel.

The above is the image decoding step.

The processing returns to FIG. 8.

Next, in step S250, the values of the channels R, G, and B decoded in step S240 are converted into the amount of ink color CMYK. Since processing of this step is generally performed by the printer PR, the details are omitted. The same applies to subsequent halftone processing in step S260 and subsequent printing in step S270.

According to the present embodiment, a color image in which one channel is configured by N bits (N>1) is encoded into a 1-bit color image, and the 1-bit color image is decoded into an original N-bit color image by the printer PR, and thereby, the amount of data to be transferred can be reduced to 1/N. Thereby, a compression rate can be improved by saving the encoded data. As a result, image transfer after compression is accelerated, and decoding on the printer PR side can also be accelerated.

Content derived from the embodiment will be described below.

An image processing method includes an image encoding step of encoding data in which one channel in each pixel of image data including a plurality of pixels is configured by 2 bits or more into data in which the one channel is configured by 1 bit, a transfer step of transferring the encoded data to a printing apparatus, and an image decoding step of decoding the encoded data in the printing apparatus, wherein the image encoding step is characterized in that flag information indicating whether the pixel is a character or a line image or a photograph is assigned, and the image decoding step is characterized in that decoding is performed by selecting a first decoding method or a second decoding method based on the flag information.

According to this, a color image in which one channel is configured by N bits (N>1) is encoded into a 1-bit color image, and the 1-bit color image is decoded into the original N-bit color image by a printing apparatus, and thereby, the amount of data to be transferred can be reduced to 1/N. Thereby, a compression rate can be improved by saving the encoded data. As a result, image transfer after compression is accelerated, and decoding on the printing apparatus side can also be accelerated.

In the above-described image processing method, it is preferable that an error is diffused in the main scanning direction by using an error diffusion method to form the 1-bit data in the image encoding step.

According to this, an encoding algorithm is simple, and thus, an efficient compression can be made.

In the above-described image processing method, it is preferable that the 1-bit data is decoded into 8-bit data in the image decoding step.

According to this, efficient decoding can be performed.

The image processing method preferably includes an image compression step of further compressing the encoded data.

According to this, the encoded data is further compressed, and thereby, the amount of data transferred to the printing apparatus can be reduced. Further, by decompressing the data encoded by the printing apparatus, it is possible to perform printing without need to transfer data used for color conversion processing and halftone processing other than the printing apparatus.

In the above-described image processing method, it is preferable to use a run-length compression in the image compression step.

According to this, a compression rate can be further improved by combining with an existing compression technology.

In the above-described image processing method, it is preferable to calculate a ratio of the pixels that are ON in a predetermined range of a plurality of pixels and to set a value obtained by multiplying the ratio by a maximum gradation value per pixel to a value in the predetermined range of the plurality of pixels in the image decoding step.

According to this, efficient decoding can be performed.

An image processing apparatus includes an image encoding section that encodes data in which one channel in each pixel of image data including a plurality of pixels is configured by 2 bits or more into data in which the one channel is configured by 1 bit, a transfer section that transfers the encoded data to a printing apparatus, and an image decoding section that decodes the encoded data by using a printing apparatus, wherein the image encoding section is characterized to assign flag information indicating whether the pixel is a character or a line image or a photograph, and the image decoding section is characterized to perform decoding by selecting a first decoding method or a second decoding method based on the flag information.

According to this, a color image in which one channel is configured by N bits (N>1) is encoded into a 1-bit color image, the 1-bit color image is decoded into the original N-bit color image by the printing apparatus, and thereby, the amount of data to be transferred can be reduced to 1/N. Thereby, a compression rate can be improved by saving the encoded data. As a result, image transfer after compression is accelerated, and decoding on the printing apparatus side can also be accelerated.

In the above-described image processing apparatus, it is preferable that the image encoding section diffuses an error in the main scanning direction by using an error diffusion method to form the 1-bit data.

According to this, an encoding algorithm is simple, and thus, an efficient compression can be made.

In the above image processing apparatus, it is preferable that the image decoding section decodes the 1-bit data into 8-bit data.

According to this, efficient decoding can be performed.

It is preferable that the above-described image processing apparatus includes an image compression section which further compresses the encoded data.

According to this, the encoded data is further compressed, and thereby, the amount of data transferred to the printing apparatus can be reduced. Further, by decompressing the data encoded by the printing apparatus, it is possible to perform printing without need to transfer data used for color conversion processing and halftone processing other than the printing apparatus.

In the above-described image processing apparatus, it is preferable that the image compression section uses a run-length compression.

According to this, a compression rate can be further improved by combining with an existing compression technology.

In the image processing apparatus, it is preferable for the image decoding section to calculate a ratio of pixels which are ON in a predetermined range of a plurality of pixels and to set a value obtained by multiplying the ratio by a maximum gradation value per pixel to the value in the predetermined range of the plurality of pixels.

According to this, efficient decoding can be performed.

What is claimed is:

1. An image processing method comprising:
    an image encoding step of encoding data in which one channel in each pixel of image data including a plurality of pixels is configured by 2 bits or more into data in which the one channel is configured by 1 bit;
    a transfer step of transferring the encoded data to a printing apparatus; and
    an image decoding step of decoding the encoded data in the printing apparatus, wherein
    in the image encoding step, flag information indicating whether the pixel is a character or a line image, or a photograph is assigned,
    in the image decoding step, decoding is performed by selecting a first decoding method or a second decoding method based on the flag information, and
    in the image decoding step, a ratio of the pixels that are ON in a predetermined range of the plurality of pixels is calculated and a value obtained by multiplying the ratio by a maximum gradation value per pixel is set to the value in the predetermined range of the plurality of pixels.

2. The image processing method according to claim 1, wherein,
    in the image encoding step, an error is diffused in a main scanning direction by using an error diffusion method to form the 1-bit data.

3. The image processing method according to claim 1, wherein, in the image decoding step, the 1-bit data is decoded into 8-bit data.

4. The image processing method according to claim 1, further comprising:

an image compression step of further compressing the encoded data.

5. The image processing method according to claim 4, wherein, in the image compression step, a run-length compression is used.

6. An image processing apparatus comprising:

a first processor executing a function of an image encoding unit that encodes data in which one channel in each pixel of image data including a plurality of pixels is configured by 2 bits or more into data in which the one channel is configured by 1 bit;

a communication interface that transfers the encoded data to a printing apparatus; and a second processor executing a function of an image decoding unit that decodes the encoded data using the printing apparatus, wherein the image encoding unit assigns flag information indicating whether the pixel is a character or a line image, or a photograph, and the image decoding unit performs decoding by selecting a first decoding method or a second decoding method based on the flag information, and the image decoding unit calculates a ratio of the pixels that are ON in a predetermined range of the plurality of pixels and sets a value obtained by multiplying the ratio by a maximum gradation value per pixel to the value in the predetermined range of the plurality of pixels.

7. The image processing apparatus according to claim 6, wherein the image encoding unit diffuses an error in a main scanning direction by using an error diffusion method to form the 1-bit data.

8. The image processing apparatus according to claim 6, wherein the image decoding unit decodes the 1-bit data into 8-bit data.

9. The image processing apparatus according to claim 6, wherein:

the first processor further executes a function of an image compression unit that compresses the encoded data.

10. The image processing apparatus according to claim 9, wherein the image compression unit uses a run-length compression.

* * * * *